(12) United States Patent
Sumada et al.

(10) Patent No.: US 8,419,244 B2
(45) Date of Patent: Apr. 16, 2013

(54) MOTORCYCLE LAMP FOR VEHICLE

(75) Inventors: Takashi Sumada, Saitama (JP);
Tomonori Hayashi, Saitama (JP); Tetsu Horiuchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 422 days.

(21) Appl. No.: 12/840,031

(22) Filed: Jul. 20, 2010

(65) Prior Publication Data

US 2011/0051440 A1 Mar. 3, 2011

(30) Foreign Application Priority Data

Aug. 27, 2009 (JP) ................................. 2009-197094
Aug. 27, 2009 (JP) ................................. 2009-197095

(51) Int. Cl.
*B62J 6/00* (2006.01)
*F21V 33/00* (2006.01)

(52) U.S. Cl.
USPC .......................................... 362/473; 362/549

(58) Field of Classification Search .................. 362/473, 362/549, 217.12, 217.13; 180/219; 340/479
See application file for complete search history.

(56) References Cited

U.S. PATENT DOCUMENTS 5,955,945 A * 9/1999 Fuhrer .......................... 340/479
2009/0185388 A1 * 7/2009 Kageyama ..................... 362/473

FOREIGN PATENT DOCUMENTS

| JP | 60-71013 U | 5/1985 |
| JP | 62-53506 U | 4/1987 |
| JP | 6-17003 U | 3/1994 |
| JP | 62-105306 A | 5/1997 |
| JP | 2005-71723 A | 3/2005 |
| JP | 2006-096233 A | 4/2006 |
| JP | 3877824 B2 | 11/2006 |

* cited by examiner

*Primary Examiner* — Mariceli Santiago
*Assistant Examiner* — Glenn Zimmerman
(74) *Attorney, Agent, or Firm* — Birch, Stewart, Kolasch & Birch, LLP

(57) ABSTRACT

A motorcycle includes a seat, side covers covering the periphery of the lower side of the seat and formed in curved shapes to gradually decrease in width toward the rear side of the vehicle. Rear blinkers mounted to left and right portions in the vehicle width direction of the side covers. Each of the rear blinkers includes a base member mounted to the side cover, a bulb and a lens covering the bulb. The left and right rear blinkers are disposed at recesses provided in the side covers. Each of the left and right rear blinkers is mounted to the side cover in such a manner that the lens is substantially entirely exposed from the recess to not overlap with a curved surface of the side cover in plan sectional view as viewed from the upper side of the vehicle, the section containing the optical axis of the bulb.

11 Claims, 11 Drawing Sheets

MOTORCYCLE LAMP FOR VEHICLE

CROSS-REFERENCE TO RELATED APPLICATIONS

The present application claims priority under 35 USC 119 to Japanese Patent Application No. 2009-197095 filed on Aug. 27, 2009 and Japanese Patent Application No. 2009-197094 filed on Aug. 27, 2009 the entire contents of which are hereby incorporated by reference.

FIELD OF THE INVENTION

The present invention relates to a motorcycle equipped with turn signal lamps.

DESCRIPTION OF BACKGROUND ART

Conventionally, a motorcycle is known wherein each rear side cover is provided with a recess of an elliptical shape elongated in the front-rear direction with a turn signal lamp disposed in the recess. See, for example, Japanese Patent No. 3877824. In Japanese Patent No. 3877824, the turn signal lamp is disposed on the front side relative to the rear end of the recess.

However, the above-mentioned conventional motorcycle has the following problem. Since the turn signal lamp is disposed in the recess and disposed in proximity to the rear side cover, it is possible to eliminate the feeling of protrusion of the turn signal lamp from the cover and to provide the cover with an integral appearance design, but the visibility of the turn signal lamp may be lowered if the turn signal lamp is designed to be light in weight and compact. For example, when the turn signal lamp disposed on the left side in the vehicle is viewed from the right rear side of the vehicle, the turn signal lamp would be hidden in the recess, so that it is difficult to secure the visibility of the turn signal lamp on the vehicle left side. Accordingly, it is desired to secure visibility of turn signal lamps, even where the turn signal lamps are light in weight and compact, while enhancing the appearance of the vehicle.

A configuration is also known for conventional lamps for vehicles in which a unit is obtained by preliminarily assembling a bulb onto a socket disposed on a reflector. The bulb is fixed to the reflector by a retainer clip, thereby mounting the bulb and the socket to the reflector. See, for example, Japanese Patent Laid-open No. 2005-71723.

In the lamp for a vehicle as above-mentioned, however, the retainer clip is needed as a fixing member for fixing the bulb and the socket to the reflector, leading to an increase in the number of component parts. Thus, problems result in regard of assembleability and maintainability.

SUMMARY AND OBJECTS OF THE INVENTION

The present invention has been made in consideration of the above-mentioned circumstances. Accordingly, it is an object of an embodiment of the present invention to ensure, in a motorcycle, that small-type turn signal lamps can be applied and the visibility of the turn signal lamps can be secured, while enhancing the appearance of the vehicle.

In order to solve the above-mentioned problem, according to an embodiment of the present invention, there is provided a motorcycle including a seat, a body cover covering the periphery of the lower side of the seat and formed in a curved shape such as to gradually decrease in width toward the rear side of the vehicle, and turn signal lamps mounted at left and right portions in the vehicle width direction of the body cover, each of the turn signal lamps including a base member mounted to the body cover, a light source, and a lens covering the light source. The left and right turn signal lamps are disposed at recesses provided in the body cover wherein each of the left and right turn signal lamps is mounted to the body cover in such a manner that the lens is substantially entirely exposed from the recess so as not to overlap with a curved surface of the body cover in a plan sectional view as viewed from the upper side of the vehicle with the section containing an axis of the light source.

According to this configuration, even in the case where each of the turn signal lamps is disposed at the recess, substantially the whole part of the lens does not overlap with the body cover in a plan sectional view, the section containing the axis of the light source, and the lens is not obstructed from view by the body cover. Consequently, the visibility of the turn signal lamps can be secured and small-type turn signal lamps can be adopted, while enhancing the appearance of the vehicle by disposing the turn signal lamps at recesses so that the turn signal lamps and the body cover have a feeling of integrity. More particularly, since the lens is substantially entirely exposed from the recess, it is possible to secure the visibility of each turn signal lamp, for example, the visibility of the turn signal lamp on the left side as viewed from the right rear side of the vehicle.

In addition, in the above configuration, the base member may include a base part for mounting to the body cover, and a case part for accommodating the light source and a reflector, and the base part and part of the case part may be disposed inside the recess.

In this case, since the base part and part of the case part are disposed in the recess, each turn signal lamp can be disposed in a compact fashion at the body cover by suppressing the amounts of protrusion of the base part and the case part from the body cover so that these parts are inconspicuous, and the turn signal lamps can be protected from mud, small stones and the like.

In addition, the whole part of the turn signal lamp may be disposed at a position on the inner side relative to a maximum width in the vehicle width direction of the body cover.

In this case, the turn signal lamp can be protected by the body cover, notwithstanding the configuration in which the lens and the base member are exposed from the recess in the body cover.

Further, a fastening member for fixing the reflector or the lens to the case part may be provided, and the fastening member may be exposed from the recess.

In this case, since the fastening member is exposed from the recess, the fastening member can externally be attached and detached easily and the maintainability of the turn signal lamps can be enhanced, notwithstanding the configuration in which the turn signal lamps are disposed at the recesses in the body cover.

Furthermore, the fastening member may be fastened at a lower surface of the turn signal lamp.

In this case, since the fastening member is fastened at the lower surface of the turn signal lamp and the fastening member is thus provided at such a position as to be difficult to see from the outside of the vehicle, the appearance of the turn signal lamp can be enhanced.

In addition, the reflector and the lens may be coupled into integrity by adhesion or fusing, and the case part and the reflector may be fastened by the fastening member.

In this case, since the reflector and the lens are united by adhesion or fusing, an effective reflecting surface of the reflector can be secured sufficiently, and sufficient visibility of the turn signal lamps can be obtained even where the turn signal lamps are disposed at the recesses in the body cover. Therefore, in the case where the turn signal lamps are disposed at the recesses in the body cover, the need to enlarge the reflectors in size and enlarge the turn signal lamps in size for the purpose of securing visibility of the turn signal lamps can be eliminated, and appearance can be enhanced.

In addition, the recess may include a first recessed portion for accommodating the base part and a second recessed portion for accommodating part of the case part, and the first recessed portion and the second recessed portion may be formed along the shapes of the base part and the case part.

In this case, since the first recessed portion and the second recessed portion are formed along the shapes of the base part and the case part, the first recessed portion and the second recessed portion can be minimized in size, which makes the recess difficult to see, so that the appearance of the vehicle can be enhanced.

Furthermore, the first recessed portion may be provided at its rear portion with a bulging portion where part of the body cover bulges toward the outside of the vehicle.

In this case, it is possible to set only the lens away from the curved surface of the body cover, so that the visibility of the turn signal lamp can be enhanced.

In the motorcycle according to an embodiment of the present invention, even where each turn signal lamp is disposed at the recess, substantially the whole part of the lens does not overlap with the body cover in a plan sectional view. Thus, the section containing the axis of the light source and the lens would not be obstructed from view by the body cover. Consequently, the visibility of the turn signal lamps can be secured and small-type turn signal lamps can be adopted, while enhancing the appearance of the vehicle by disposing the turn signal lamps at the recesses so that the turn signal lamps and the body cover have a feeling of integrity. More particularly, since substantially the whole part of the lens is exposed from the recess, it is possible to secure visibility of each turn signal lamp, for example, the visibility of the turn signal lamp on the left side as viewed from the right rear side of the vehicle.

In addition, since the base part and part of the case part are disposed in the recess, each turn signal lamp can be disposed in a compact fashion at the body cover by suppressing the amounts of protrusion of the base part and the case part from the body cover so that these parts are inconspicuous, and the turn signal lamps can be protected from mud, small stones and the like.

In addition, even where the lens and the base member are exposed from the recess in the body cover, the turn signal lamps can be protected by the body cover.

Further, since the fastening member is exposed from the recess, the fastening member can externally be attached and detached easily, so that the maintainability of the turn signal lamps can be enhanced.

Furthermore, since the fastening member is provided at the lower surface of the turn signal lamp where it is difficult to see from the outside of the vehicle, the appearance of the turn signal lamps can be enhanced.

In addition, since the reflector and the lens are united by adhesion or fusing, an effective reflecting surface of the reflector can be secured sufficiently. Therefore, where the turn signal lamps are disposed at the recesses in the body cover, the need to enlarge the reflector in size and to enlarge the turn signal lamp in size for the purpose of securing the visibility of the turn signal lamp can be eliminated. Thus, the appearance can be enhanced.

In addition, since the first recessed portion and the second recessed portion are formed along the shapes of the base part and the case part, the first recessed portion and the second recessed portion can be minimized in size, and the recess is made difficult to see, so that the appearance of the vehicle can be enhanced.

Further, it is possible to set only the lens away from the curved surface of the body cover, so that the visibility of the turn signal lamps can be enhanced.

An embodiment of the present invention reduces the number of component parts and enhances assembleability and maintainability for a lamp for a vehicle which includes a reflector.

In order to attain the above object, according to an embodiment of the present invention, there is provided a lamp for a vehicle, including a bulb, a reflector formed with a through-hole for insertion of the bulb, and a socket for supporting the bulb, characterized in that the reflector is provided, at the outside surface on the back side thereof which is located in the periphery of the through-hole, with a reflector engaging part molded integrally with the reflector, and the socket is provided with a socket engaging part for engagement with the reflector engaging part.

According to this configuration, a reflector engaging part formed as one body with the reflector is attached directly to a socket engaging part of the socket. Therefore, a fixing member for exclusive use for fixing the socket to the reflector is made unnecessary, whereby the number of component parts can be reduced, and assembleability and maintainability can be enhanced. Further, since the reflector engaging part is formed at the outside surface on the back side of the reflector, the reflector engaging part would not hinder reflection by the reflector, so that a reduction in the reflection area of the reflector can be prevented, and a light emission area can be secured without enlarging the reflector in size. Accordingly, a sufficient light emission area and a sufficient irradiation area of the reflector can be secured while making the lamp smaller in size.

In addition, in the above configuration, the bulb may be inserted into the through-hole from the back side of the reflector and disposed inside a concave part of the reflector, in the condition where the bulb and the socket have been integrally assembled onto each other, and the socket engaging part may be fitted to the reflector engaging part and the socket may be turned, to thereby engage the socket engaging part and the reflector engaging part with each other.

In this case, the bulb and the socket can be fixed to the reflector by only turning the socket in the condition where the socket engaging part of the socket with the bulb assembled thereto has been fitted to the reflector engaging part, and, therefore, assembleability and maintainability can be enhanced.

In addition, the reflector may be provided with a tubular reflector tubular part at that outside surface on the back side thereof which is located in the periphery of the through-hole, an outer peripheral wall of the reflector tubular part may be provided with the reflector engaging part; and the socket may be provided with a first tubular part for supporting the bulb and with a second tubular part on the outer peripheral side of the first tubular part, and an inner peripheral wall of the second tubular part may be provided with the socket engaging part.

In this case, since the reflector tubular part is provided with the reflector engaging part at the outer peripheral wall thereof and the reflector engaging part is engaged with the socket engaging part at the inner peripheral wall of the second tubular part, the diameter of the through-hole in the reflector tubular part can be minimized, a reduction in the reflection area of the reflector can be prevented, and a light emission area can be secured. In addition, since the socket engaging part is provided on the outer peripheral side of the first tubular part and at the inner peripheral wall of the second tubular part, the socket can be made smaller in size while securing the size of the first tubular part for supporting the bulb.

In addition, since the first tubular part and the second tubular part are coaxially provided on the inner and outer sides, the holding of the bulb and the engagement of the socket with the reflector are also achieved in a coaxial relationship, and the bulb can be held onto the reflector with good positional accuracy.

Further, a stepped portion may be formed by the first tubular part and the second tubular part at a back-side end portion of the socket, and bulb terminals may be disposed at the stepped portion.

In this case, since the bulb terminals are disposed at the stepped portion formed at a back-side end portion of the socket, a reduction in the size of the socket in the face-back direction can be promised, and the lamp can be made further smaller in size.

Further, a configuration may be adopted in which the reflector engaging part and the socket engaging part include a protrusion portion and a cutout portion for engagement with the protrusion portion, respectively, the cutout portion includes a passage portion permitting the protrusion portion to pass therethrough and an accommodating portion for accommodating the protrusion portion, a seal member is interposed between the reflector tubular part and the socket, and the protrusion portion is held in the accommodating portion by resilience arising from the seal member.

In this case, since it is possible to hold the protrusion portion in the accommodating portion and to thereby engage the socket and the reflector with each other by utilizing the seal member provided between the reflector tubular part and the socket, the number of component parts can be reduced. In addition, since the protrusion portion can be held in the accommodating portion by the resilience of the seal member, the socket and the reflector can be fixed firmly.

Furthermore, a lens covering a reflecting surface of the reflector may be provided, and the reflector and the lens may be adhered and fixed to each other.

In this case, since the lens and the reflector can be adhered and fixed to each other, for example, by using an adhesive or by fusing, without using any fixture such as screw, a reduction in the light emission area of the reflector by a fixture can be obviated, and the light emission area of the reflector can be secured.

The vehicle may be a motorcycle, the lamp may be a blinker (turn signal lamp), and the blinker may be disposed in a recess formed in a body cover of the motorcycle.

Particularly in a motorcycle, lamps have a great influence on the appearance of the vehicle, and are demanded to be smaller in size. On the other hand, the lamps of a motorcycle are desired to fulfill sufficiently the visibility thereof from a third person. According to the above-mentioned configuration, a reduction of the lamp in size can be promised while securing a sufficient light emission area and a sufficient irradiation area of the reflector. Accordingly, in a configuration in which blinkers are disposed in recesses provided in the body cover of a motorcycle, a good visibility of the blinkers is ensured, and the lamps can be prevented from adversely influencing the appearance of the vehicle.

In the lamp for a vehicle according to an embodiment of the present invention, the reflector engaging part molded as one body with the reflector is attached directly to the socket engaging part of the socket. This makes it possible to eliminate the need for a fixing member for exclusive use, to reduce the number of component parts, and to enhance assembleability and maintainability. Further, since the reflector engaging part is formed at the outside surface on the back side of the reflector, the reflector engaging part would not hinder the reflection on the reflector, so that a reduction in the reflection area of the reflector can be obviated, and a light emission area can be secured without enlarging the reflector in size. Accordingly, a sufficient light emission area and a sufficient irradiation area of the reflector can be secured, while making the lamp smaller in size.

In addition, it is possible to fit the socket engaging part to the reflector engaging part, to fix the bulb and the socket to the reflector by only turning the socket, and to enhance assembleability and maintainability.

In addition, since the reflector engaging part is provided at the outer peripheral wall of the reflector tubular part and the reflector engaging part is engaged with the socket engaging part at the inner peripheral wall of the second tubular part, it is possible to minimize the diameter of the through-hole in the reflector tubular part, to prevent a reduction in the reflection area of the reflector, and to secure a light emission area. In addition, since the socket engaging part is provided on the outer peripheral side of the first tubular part and at the inner peripheral wall of the second tubular part, it is possible to make the socket smaller in size while securing the size of the first tubular part for supporting the bulb.

In addition, since the first tubular part and the second tubular part are coaxially provided on the inner and outer sides, the holding of the bulb and the engagement of the socket with the reflector are in a coaxial relationship, so that the bulb can be held in good positional accuracy in relation to the reflector.

Further, since the bulb terminals are disposed at the stepped portion at the back-side end portion of the socket, a reduction in the size of the socket in the face-back direction can be achieved, and the lamp can be further reduced in size.

Furthermore, since the socket and the reflector can be engaged with each other while holding the protrusion portion in the accommodating portion by utilizing the seal member, the number of component parts can be reduced. In addition, since the protrusion portion can be held in the accommodating portion by the resilience of the seal member, the socket and the reflector can be fixed firmly.

In addition, since the lens and the reflector are adhered and fixed without using any fixture such as screw, a reduction in the light emission area of the reflector due to the presence of a fixture can be obviated, and the light emission area of the reflector can be secured.

Further, in the lamp for a motorcycle, a reduction in size can be achieved while securing a sufficient light emission amount. Accordingly, in a configuration in which blinkers are disposed in recesses provided in the body cover of a motorcycle, the visibility of the blinkers are enhanced, and the blinkers can be prevented from adversely affecting the appearance of the vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
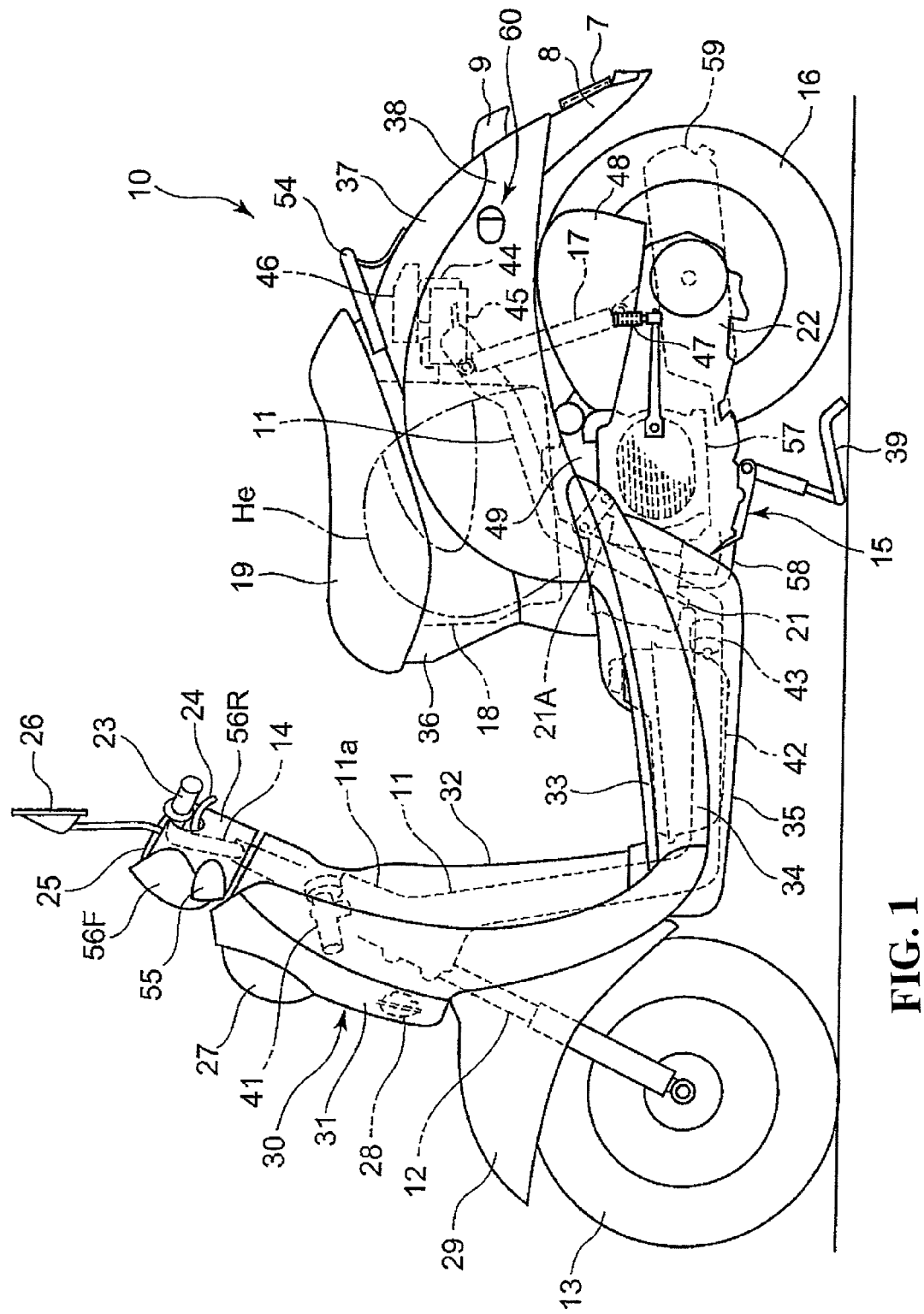
FIG. 1 is a left side view of a motorcycle pertaining to an embodiment of the present invention.

Now, a motorcycle according to an embodiment of the present invention will be described below, referring to the drawings. The directions of up, down, front, rear, left and right in the following description refer to those directions as viewed from the driver.

FIG. 1 is a left side view of the motorcycle pertaining to the present invention. The motorcycle 10 is a motor scooter type motorcycle which includes, as main components, a body frame 11, a front fork 12 mounted to a head pipe 11a at a front portion of the body frame 11, a front wheel 13 mounted to lower ends of the front fork 12, a handlebar 14 connected to the front fork 12, a power unit 15 vertically swingably mounted to a rear portion of the body frame 11, a rear wheel 16 mounted to a rear portion of the power unit 15, a rear shock absorber unit 17 bridgingly disposed between a rear end portion of the power unit 15 and a rear portion of the body frame 11, an accommodating box 18 mounted to a rear upper portion of the body frame 11, and a seat 19 disposed on the upper side of the accommodating box 18 and so mounted that the accommodating box 18 can be opened and closed.

The power unit 15 is composed of a water-cooled type engine 21 at a front portion, and a power transmission mechanism 22 at a rear portion. The engine 21 is disposed substantially horizontally, with its cylinder head directed forward.

In addition, the body frame 11 of the motorcycle 10 is covered with a body cover 30. The body cover 30 includes a front cover 31 for covering a front portion of the head pipe 11a, a leg shield 32 for covering the front side of the driver's legs, a step floor 33 on which the driver's feet are to be put, left and right floor side covers 34 extending downward from outer edges of the step floor 33, an under cover 35 for covering a space between the lower edges of the floor side covers 34, a seat lower part cover 36 for covering the periphery of a front half portion of the accommodating box 18, a rear cover 37 for covering the periphery of a rear half portion of the accommodating box 18 and a rear portion of the vehicle body, and left and right side covers 38 (body covers) extending rearward continuously from the seat lower part cover 36 and connected to the rear cover 37. The left and right side covers 38 are separately formed as left and right parts constituting a left-right pair, and cover the periphery of a space on the lower side of the seat 19.

An ignition key cylinder 41 is disposed inside the leg shield 32, and a fuel tank 42 and a fuel pump 43 are disposed under the step floor 33. A tray (omitted in the drawing) is provided at an upper end portion of a rear part of the body frame 11. A radiator reservoir tank 44, a battery 45 and a control unit 46 are disposed in the tray.

Further, a central portion of the handlebar 14 is covered with a handlebar front cover 56F and a handlebar rear cover 56R, and the handlebar rear cover 56R is fitted with front blinkers 55 provided as a pair of left and right ones arrayed in the vehicle width direction.

A tail lamp 9 is provided at the vehicle width center of rear portions of the side covers 38, and a rear fender 8 which is continuous with the side covers 38 and which covers the upper side of the rear wheel 16 is mounted on the lower side of the tail lamp 9. A number plate 7 is attached to the rear fender 8.

In addition, on the front side relative to the tail lamp 9, rear blinkers 60 as turn signal lamps provided in a pair of left and right ones arrayed in the vehicle width direction are attached to the left and right side covers 38, respectively. The rear blinker 60 is formed in an ellipsoidal shape, and is disposed with its light emitting surface directed toward the rear side of the vehicle.

In FIG. 1, a handle grip 23, a brake bar 24, a meter 25, a mirror 26, a head lamp 27, a horn 28, a front fender 29, a power unit mounting hanger 21A, a engine-starting kick pedal 47, an air cleaner 48, a carburetor 49, an engine-cooling radiator 57, an engine exhaust pipe 58, an exhaust muffler 59, a main stand 39, a carrier 54 and a helmet He are provided.

Figure 2:
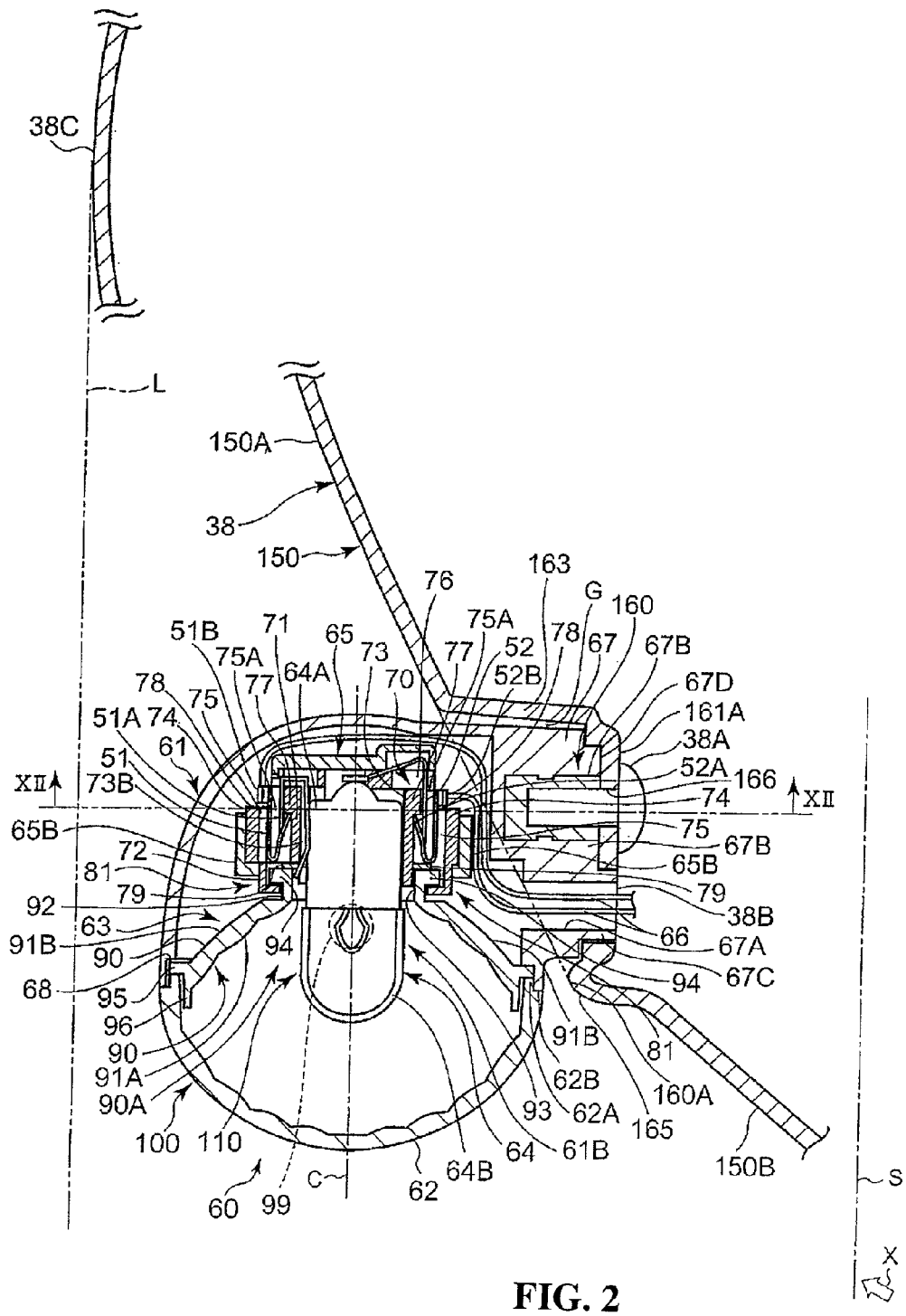
FIG. 2 is a plan sectional view, as viewed from above, of a rear blinker on the left side in a vehicle.
Figure 3:
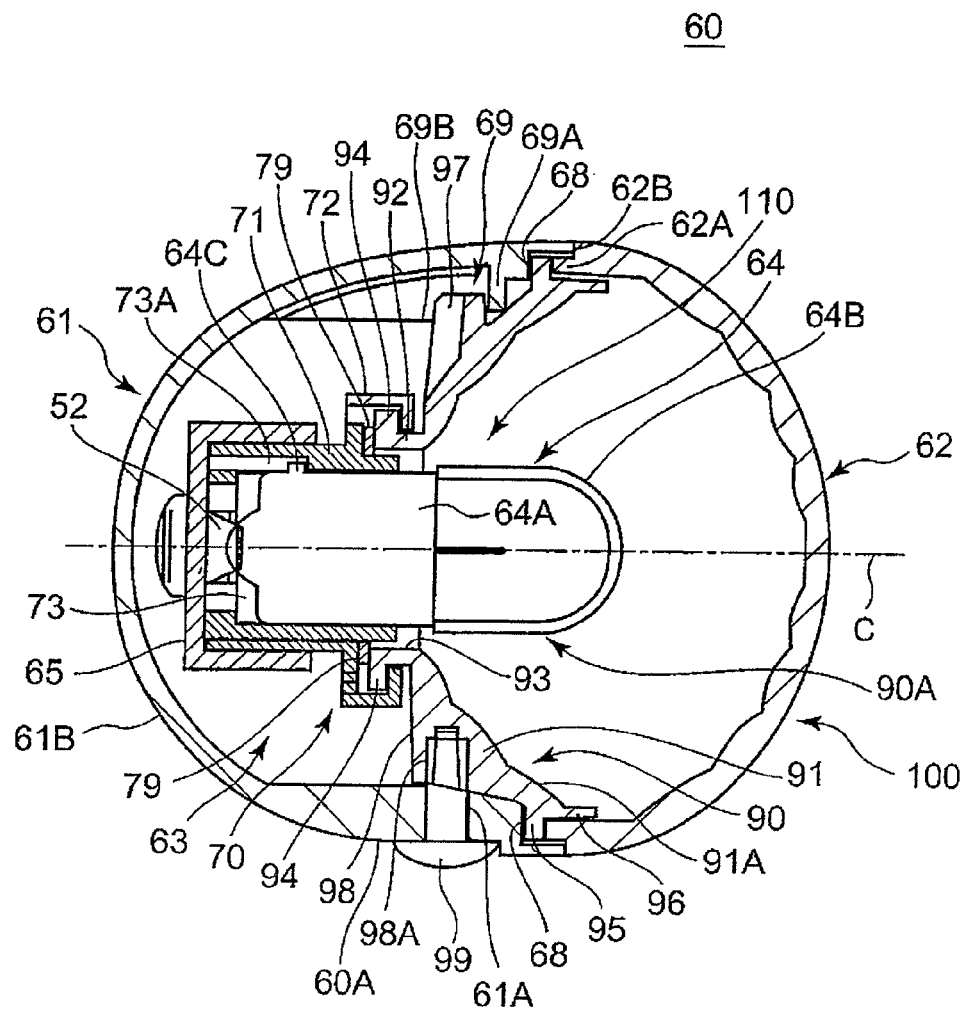
FIG. 3 is a side sectional view, as viewed from the left side of the vehicle, of the rear blinker on the left side in the vehicle.
Figure 4:
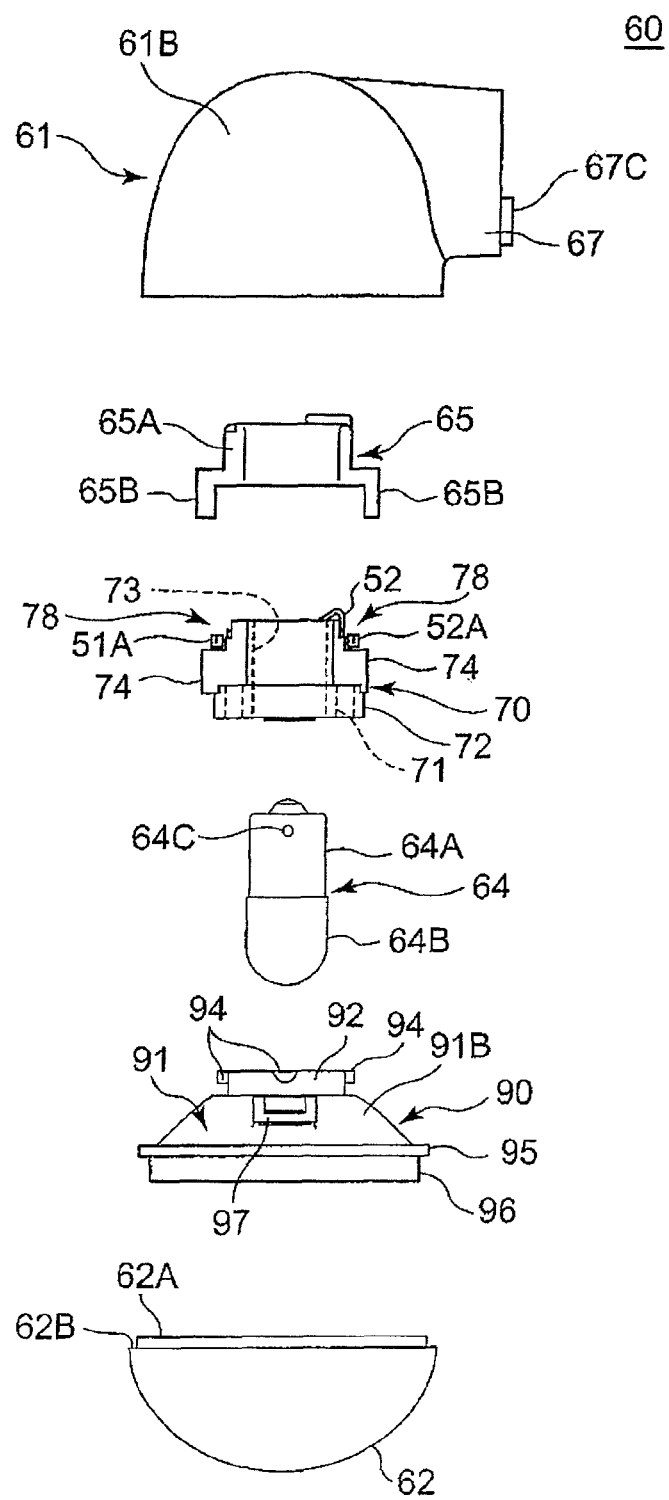
FIG. 4 is an exploded plan view, as viewed from above, of the rear blinker on the left side in the vehicle.
Figure 5:
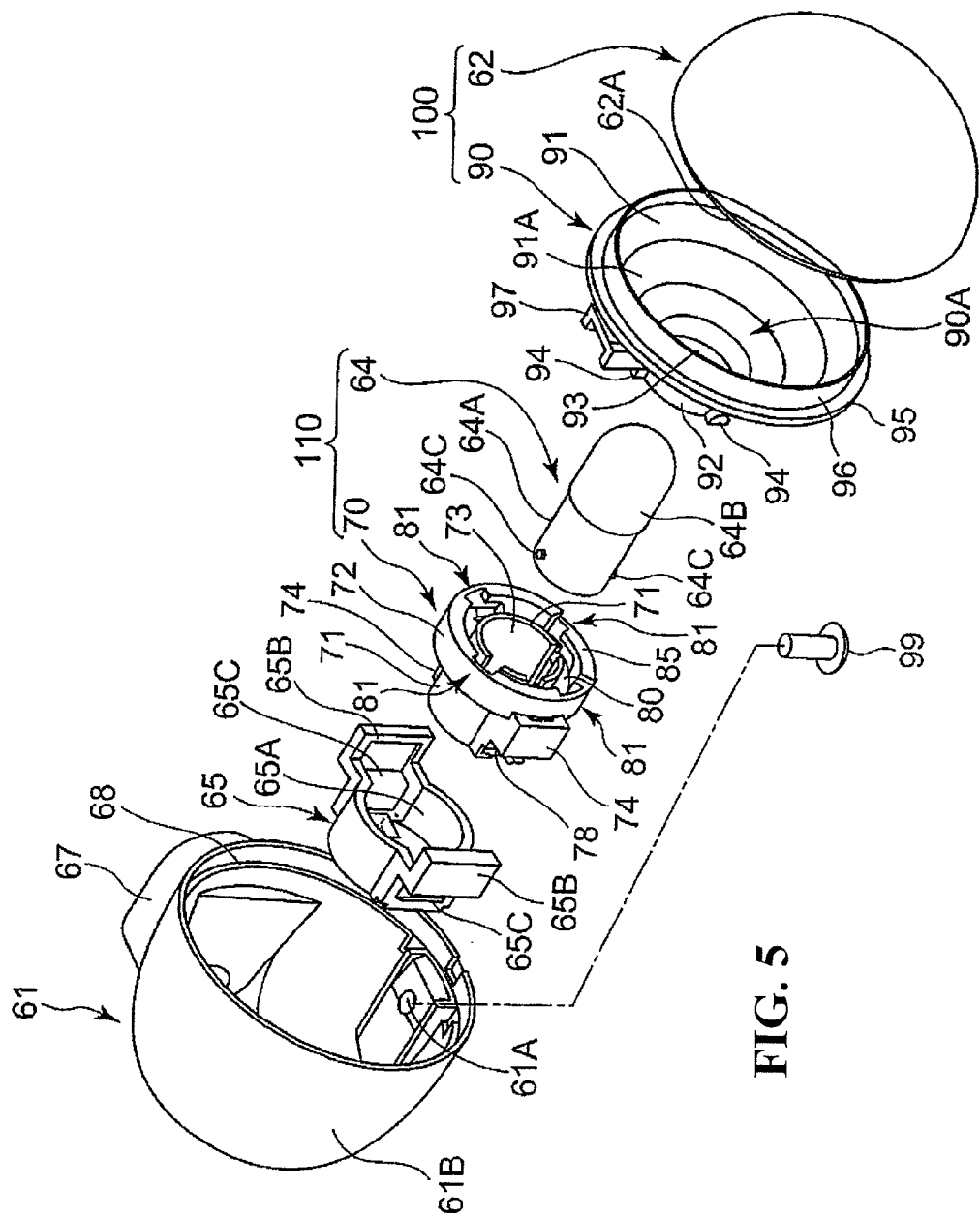
FIG. 5 is an exploded perspective view of the rear blinker.

FIG. 2 is a plan sectional view, as viewed from above, of the rear blinker 60 on the left side in the vehicle. FIG. 3 is a side sectional view, as viewed from the left side of the vehicle, of the rear blinker 60 on the left side in the vehicle. FIG. 4 is an exploded plan view, as viewed from above, of the rear blinker 60 on the left side in the vehicle. FIG. 5 is an exploded perspective view of the rear blinker 60. Here, the rear blinkers 60 are disposed as a pair of left and right ones, and the left and right rear blinkers 60 are configured to be symmetrical on the left and right sides. In view of this, in this embodiment, the rear blinker 60 on the left side in the vehicle will be described.

As shown in FIGS. 2 to 5, the rear blinker 60 has a structure in which a substantially hemispherical lens 62 for covering an aperture at one end of a base member 61 formed in a hollow hemispheroidal shape is attached to the base member 61, to form a lamp chamber 63. A bulb 64 as a light source formed in a cylindrical shape, a socket 70 for supporting the bulb 64, a waterproof cover 65 for covering a rear portion of the socket 70, and a reflector 90 provided so as to surround the periphery of the bulb 64, are accommodated in the lamp chamber 63.

As shown in FIG. 2, the rear blinker 60 is fixed to the side cover 38 so as to protrude on a left side surface of the vehicle body, and is disposed so that the lens 62 as a light emitting surface provided at the face end of the rear blinker 60 is directed toward the rear side of the vehicle. More specifically, the rear blinker 60 is so mounted that the lens 62 at the face portion of the rear blinker 60 is directed toward the rear side of the vehicle and that it is visible from the rear side of the vehicle. In the description of this embodiment, the side of the lens 62 is taken as the face side of the rear blinker 60, and the side of the base member 61 is taken as the back side of the rear blinker 60.

The bulb 64 includes a barrel part 64A supported in the state of being fitted in the socket 70, and a light emitting part 64B having a filament and extending toward the face end side of the rear blinker 60 from the barrel part 64A. An optical axis C passing through the center of the bulb 64 and extending rearward coincides with the optical axis of the rear blinker 60. The barrel part 64A is provided, at two positions, with protuberant portions 64C which are protuberant in the radial direction of the barrel part 64A.

The socket 70 has a first tubular part 71 for supporting the bulb 64 by fitting to the barrel part 64A, and a second tubular part 72 formed in a cylindrical shape on the outer peripheral side of the first tubular part 71. The first tubular part 71 and the second tubular part 72 are formed integrally, and are provided coaxially. The first tubular part 71 is formed with a through-hole 73 for insertion of the barrel part 64A. As shown in FIG. 3, the through-hole 73 is provided in its inner peripheral surface with engaging grooves 73A for engagement with the protuberant portions 64C of the bulb 64. In addition, as shown in FIG. 5, the second tubular part 72 is formed so as to protrude in the radial direction from the first tubular part 71, on the face end side of the socket 70. Here, the socket 70 is formed from a synthetic resin.

As shown in FIGS. 2 and 5, the second tubular part 72 is provided on its back end side with protruding portions 74 protruding over the outer peripheral surface of the first tubular part 71. The protruding portions 74 are provided at opposed two positions over the outer peripheral surface of the first tubular part 71, and a hollow terminal accommodating portion 75 is formed between each of the protruding portions 74 and the first tubular part 71. The terminal accommodating portion 75 is provided with an aperture 75A on the back end side thereof, and a terminal to be connected to the bulb 64 is accommodated in the terminal accommodating portion 75 through the aperture 75A.

A minus terminal 51 to be put in contact with the outer peripheral surface of the barrel part 64A is accommodated in the terminal accommodating portion 75 on one side, whereas a plus terminal 52 to be put in contact with the back end of the barrel part 64A is accommodated in the terminal accommodating portion 75 on the other side. The socket 70 is provided at its back end with terminal grooves 76 formed by hollowing back end portions, and each of the minus terminal 51 and the plus terminal 52 extends through the terminal groove 76 and through the inside of each terminal accommodating portion 75 into the through-hole 73, to be electrically connected to the barrel part 64A.

The minus terminal 51 extends through a groove portion 73B, which is formed in the inner surface of the through-hole 73, to the face end side of the socket 70. The plus terminal 52 is bent so as to make contact with the back end of the barrel part 64A, and resilience of the plus terminal 52 urges the bulb 64 toward the face end side. In other words, the bulb 64 is fixed to the socket 70 by being urged toward the face end side by the plus terminal 52 in the condition where its protuberant portions 64C are in engagement with the engaging groove 73A. At the time of assembling, the protuberant portions 64C are engaged with the engaging groove 73A, whereby the bulb 64 and the socket 70 can preliminarily be assembled onto each other to form a unit.

As shown in FIG. 2, on the back end side in the inside of each terminal accommodating portion 75, a hook portion 77 is formed by projecting the first tubular part 71 one step in the radial direction. The minus terminal 51 and the plus terminal 52 have claw parts 51A and 52A, respectively, and the claw parts 51A and 52A are hooked on the hook portions 77, whereby the minus and plus terminals 51 and 52 are locked inside the terminal accommodating portions 75.

In addition, the protruding portions 74 of the second tubular part 72 protrude to the outside of the first tubular part 71, whereby stepped portions 78 hollowed to the inner peripheral side of the second tubular part 72 are formed on the back end side of the protruding portions 74. The minus terminal 51 and the plus terminal 52 respectively have terminal portions 51B and 52B (bulb terminals) disposed to project into the inside of the stepped portions 78, and wires 66 for connecting the minus terminal 51 and the plus terminal 52 to a control circuit (omitted in the drawings) provided on the side of the body frame 11 are connected to the terminal portions 51B and 52B, respectively. With the terminal portions 51B and 52B thus disposed in the stepped portions 78 formed at the back end portion of the socket 70, the terminal portions 51B and 52B would not protrude in the face-back direction of the socket 70, so that the socket 70 provided with the minus terminal 51 and the plus terminal 52 can be configured to be compact.

As shown in FIG. 5, the waterproof cover 65 has a fitting portion 65A for fitting to the outer periphery of the first tubular part 71, and arm portions 65B for externally covering the protruding portions 74, and is so mounted as to cover a back end portion of the socket 70. In addition, the fitting portion 65A is formed with a wiring hole 65C permitting the wires 66 to pass therethrough. The waterproof cover 65 is formed from an elastomer.

The reflector 90 includes a reflector body part 91 having a roughly paraboloid-shaped concave portion 90A. A reflector tubular part 92 extending in a cylindrical shape in the axial direction of the bulb 64 toward the back end side of the rear blinker 60 is erectly provided at a vertex portion of the roughly paraboloid-shaped surface of the reflector body part 91. The reflector tubular part 92 is formed with a through-hole 93 for insertion of the bulb 64. The reflector tubular part 92 is formed around the through-hole 93.

The reflector tubular part 92 is provided at its back end with a plurality of reflector engaging parts 94 protruding in the radial direction of the reflector tubular part 92. As shown in FIGS. 2 and 3, the reflector 90 is fixed to the socket 70 by a process in which the reflector engaging parts 94 are engaged with a face end portion of the second tubular part 72 of the socket 70. Here, the reflector 90 is formed from a synthetic resin; specifically, the reflector body part 91, the reflector tubular part 92 and the reflector engaging parts 94 are integrally formed by resin molding.

In addition, an elastic sheet-shaped seal member 79 is interposed between the reflector tubular part 92 and the socket 70. The gap between the reflector tubular part 92 and the socket 70 is sealed with the seal member 79, whereby the unit is waterproof.

A reflecting surface 91A for reflecting the light emitted from a light emitting part 64B is formed at the inside surface of the roughly paraboloid-shaped concave portion 90A of the reflector body part 91. The light emitted from the light emitting part 64B disposed in the center of the concave portion 90A is distributed by the reflecting surface 91A, to be cast from the face end of the rear blinker 60 toward the rear side of the vehicle.

In addition, outside surfaces of the reflector body part 91 and the reflector tubular part 92 constitute an outside surface 91B on the back side of the reflecting surface 91A. The reflector body part 91 is formed at its face end portion with a flange portion 95 projecting in the radial direction from the outside surface 91B. The flange portion 95 is formed in an annular shape along the whole circumference of the outside surface 91B. The flange portion 95 is erectly provided with an annular wall portion 96 formed to have a diameter smaller than the outside diameter of the flange portion 95.

On the back end side of the reflector body part 91, as shown in FIGS. 3 to 5, an engaging protrusion 97 protruding in the radial direction from the outside surface 91B is formed. The engaging protrusion 97 is engaged with an engaging protuberant portion 69 (see FIG. 3) which will be described later. As shown in FIG. 3, a boss portion 98 protruding in the radial direction is provided on the outside surface 91B at a position opposite to the engaging protrusion 97. The boss portion 98 is formed with a female screw portion 98A. A screw 99 (fastening member) for fixing the reflector 90 to the base member 61 is fastened into the female screw portion 98A.

The hemispherical lens 62 is mounted with its convex curved surface portion directed toward the face end side of the rear blinker 60, and covers the reflecting surface 91A. The lens 62 is formed at its back end with an annular lens-side engaging part 62A for external engagement with an outer peripheral surface of the wall portion 96 of the reflector body part 91. In addition, the lens-side engaging part 62A is provided at its outer peripheral surface with a stepped portion 62B hollowed one step from a peripheral edge portion at the back end of the lens 62.

The lens 62 is positioned through a process in which the lens-side engaging part 62A is abutted on the flange portion 95 of the reflector body part 91 and is engaged with the wall portion 96. The lens 62 is fixed by fusing the lens-side engaging part 62A to the flange portion 95 and the wall portion 96. The lens 62 and the reflector 90 are preliminarily united by fusing, before assembly of the rear blinker 60, to constitute a reflector unit 100.

In addition, after assembled to constitute the rear blinker 60, the stepped portion 62B is in engagement with the face end of the base member 61 so that the step at the stepped portion 62B is filled up. As a result, the seam between the lens 62 and the base member 61 is inconspicuous, so that improved appearance can be secured. Here, the lens 62 is formed from a light-transmitting synthetic resin.

As shown in FIG. 2, the base member 61 includes: a case part 61B for accommodating the bulb 64, the socket 70, the waterproof cover 65 and the reflector 90; and a base part 67 protruding in the radial direction from an outer peripheral surface of the case part 61B. The base part 67 is used for attaching the rear blinker 60 to the side cover 38. The base part 67 is provided with a wiring hole portion 67A for passing the wires 66 through the wiring hole 38B formed in the side cover 38, and a female screw portion 67B. The rear blinker 60 is fixed to the side cover 38 by a set screw 38A fastened into the female screw portion 67B from the side of the side cover 38. In addition, the base member 61 is positioned by engagement of a positioning protrusion 67C, which is provided at an end of the wiring hole portion 67A, with the wiring hole 38B in the side cover 38.

The base member 61 is provided at its face end portion with a mounting stepped portion 68 formed by a method in which the plate thickness of the base member 61 is reduced one step on the inner peripheral side. In addition, as shown in FIG. 3, a hole 61A for insertion of the screw 99 is provided on the back side of the mounting stepped portion 68, and the engaging protuberant portion 69 for engagement with the engaging protrusion 97 of the reflector 90 is formed at that inner peripheral surface of the base member 61 which is opposite to the hole 61A. The engaging protuberant portion 69 has a face-side wall part 69A coming into abutment on a face-side surface of the engaging protrusion 97 to thereby restrain the reflector 90 from moving toward the face side, and a side wall part 69B coming into contact with both side surfaces of the engaging protrusion 97 to thereby restrain the reflector 90 from moving in rotating directions.

The reflector 90 is fixed to the base member 61 through a process in which the screw 99 is fastened into the female screw portion 98A of the reflector 90 through the hole 61A in the condition where the engaging protrusion 97 and the engaging protuberant portion 69 are mutually engaged and where the flange portion 95 is in abutment on the mounting stepped portion 68.

In addition, the screw 99 is provided on the lower side in FIG. 3, specifically, at a lower surface 60A of the rear blinker 60. This ensures that the screw 99 is not easily seen when the motorcycle 10 is viewed from the outside, so that the appearance of the motorcycle 10 can be enhanced.

Figure 6:
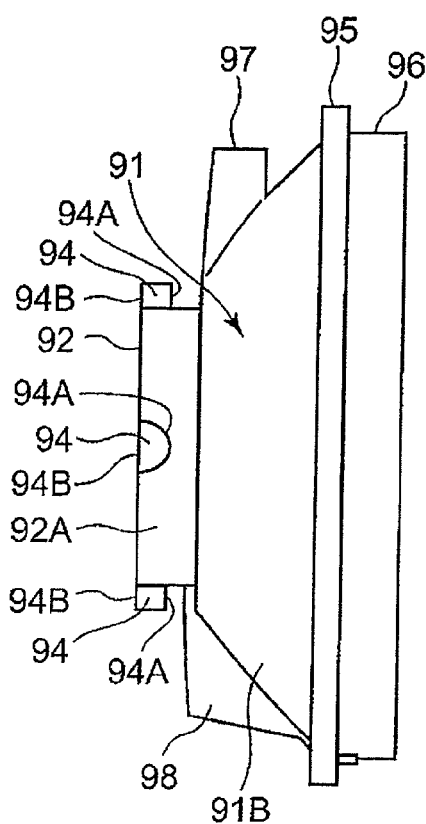
FIG. 6 is a side view, as viewed from the left side of the vehicle, of a reflector.
Figure 7:
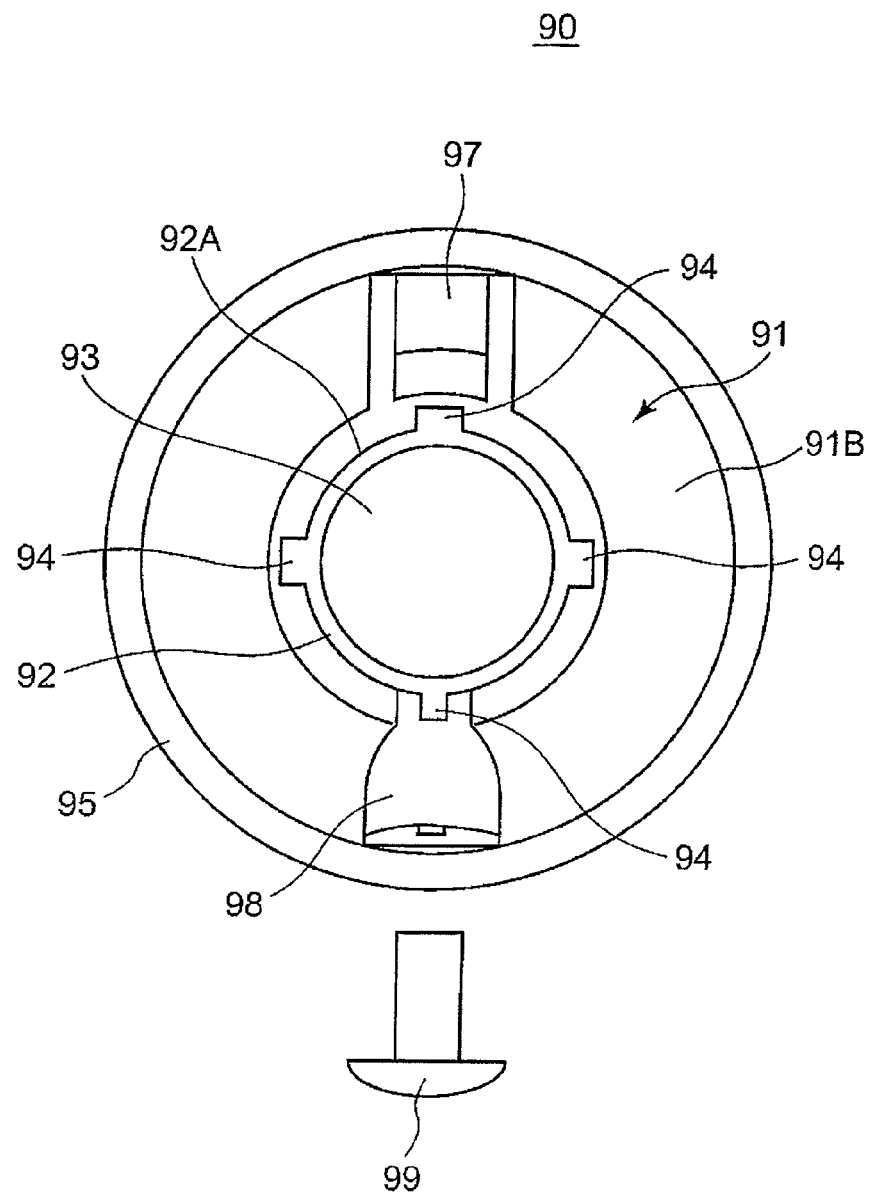
FIG. 7 is a front view, as viewed from the back end side of the rear blinker, of the reflector.

FIG. 6 is a side view, as viewed from the left side of the vehicle, of the reflector 90. FIG. 7 is a front view, as viewed from the back end side of the rear blinker 60, of the reflector 90.

As shown in FIGS. 6 and 7, the reflector engaging parts 94 are columnar protrusion parts protruding in the radial directions from the back end of an outer peripheral wall 92A of the reflector tubular part 92, and are provided at four positions equally spaced along the circumferential direction of the outer peripheral wall 92A of the reflector tubular part 92. More specifically, the reflector engaging parts 94 are provided at four positions on the outer peripheral wall 92A of the reflector tubular part 92, the four positions being at angular intervals of about 90°.

As shown in FIG. 6, each of the reflector engaging parts 94 is formed to be semicircular when viewed along the axial direction of the columnar shape thereof. The reflector engaging part 94 has a curved surface portion 94A which is formed as a convex curved surface, and a flat portion 94B which is flat. The curved surface portion 94A is arranged with its convex portion directed toward the face end side of the rear blinker 60, and the flat portion 94B is formed to be flush with the back end of the reflector tubular part 92.

Figure 8:
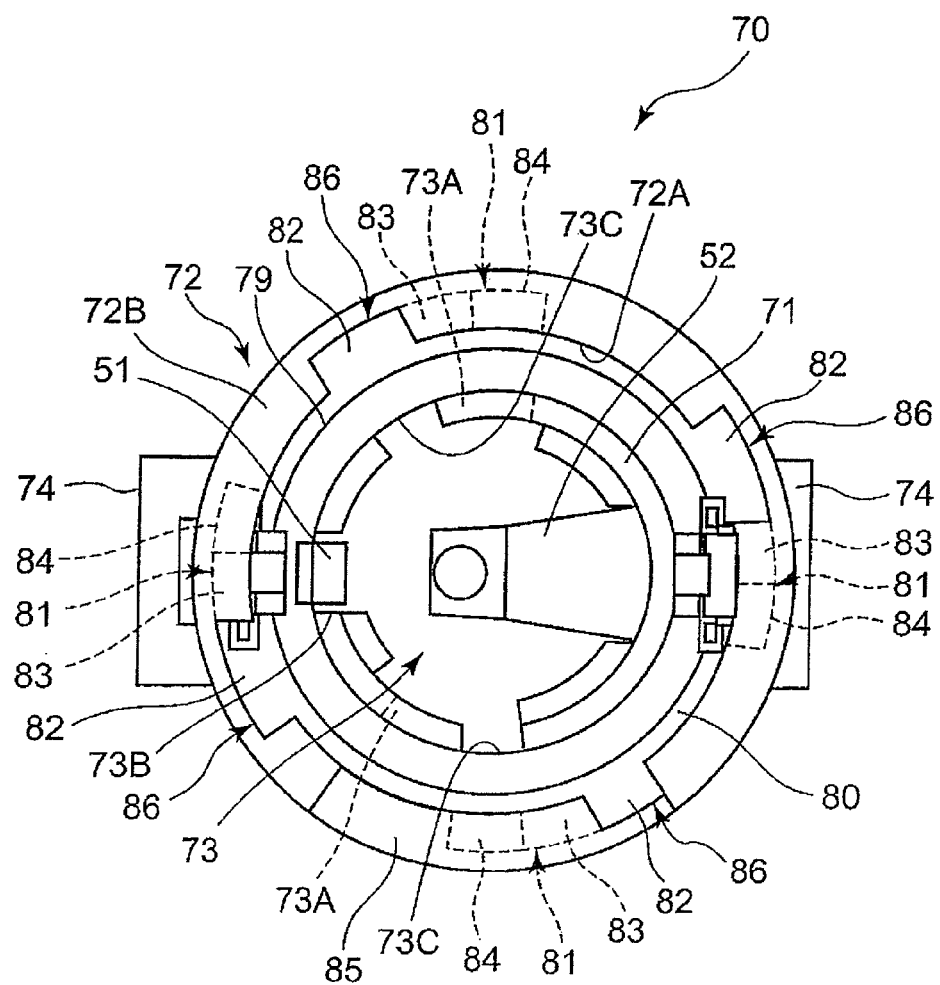
FIG. 8 is a front view, as viewed from the face end side of the rear blinker, of a socket.
Figure 9:
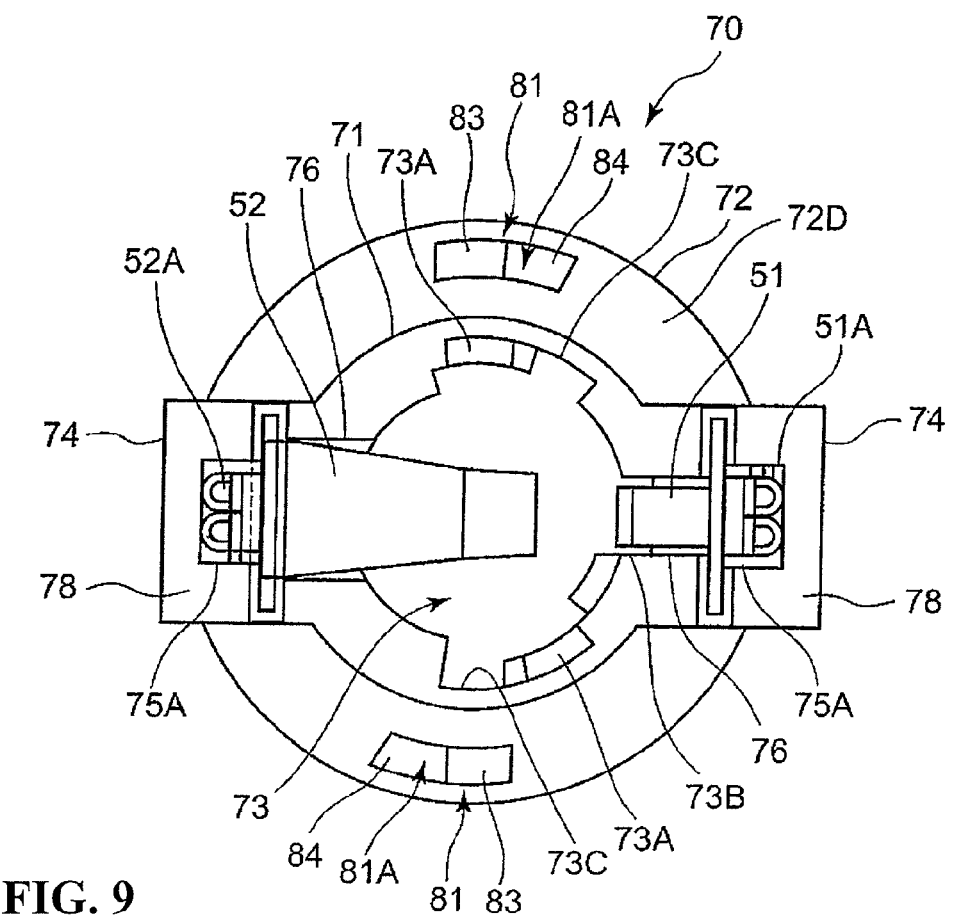
FIG. 9 is a front view, as viewed from the back end side of the rear blinker, of the socket.

FIG. 8 is a front view, as viewed from the face end side of the rear blinker 60, of the socket 70. FIG. 9 is a front view, as viewed from the back end side of the rear blinker 60, of the socket 70.

As shown in FIGS. 8 and 9, the inner peripheral surface of the through-hole 73 is formed with two inlet grooves 73C penetrating along the axial direction of the through-hole 73. The inlet grooves 73C are continuous respectively with the two engaging grooves 73A formed on the back side of the through-hole 73. The protuberant portions 64C of the bulb 64 are engaged with the engaging grooves 73A through the inlet grooves 73C. More specifically, the bulb 64 is fixed through a process in which the barrel part 64A is inserted into the through-hole 73 while passing the protuberant portions 64C through the inlet grooves 73C. Thereafter, the bulb 64 is rotated clockwise in FIG. 8 to put the protuberant portions 64C into engagement with the engaging grooves 73A.

As shown in FIGS. 5 and 8, a bottom portion 80 hollowed toward the back side relative to face end portions of the first tubular part 71 and the second tubular part 72 is formed between the first tubular part 71 and the second tubular part 72 in the radial direction of the socket 70. The bottom portion 80 is formed in an annular shape along the whole circumference of and on the outer peripheral side of the first tubular part 71. The annular seal member 79 is provided at the bottom portion 80.

In addition, an inner peripheral wall 72A of the second tubular part 72 is provided with groove-formed socket engaging parts 81 formed by digging the inner peripheral wall 72A toward the outer peripheral side. The reflector 90 is fixed to the socket 70 by engagement of the reflector engaging parts 94 with the socket engaging parts 81.

The socket engaging parts 81 are provided at four positions substantially equally spaced along the circumferential direction of the inner peripheral wall 72A of the second tubular part 72. More specifically, the socket engaging parts 81 are provided at the four positions corresponding to the layout of the reflector engaging parts 94, the four positions being spaced at angular intervals of about 90°.

Figure 10:
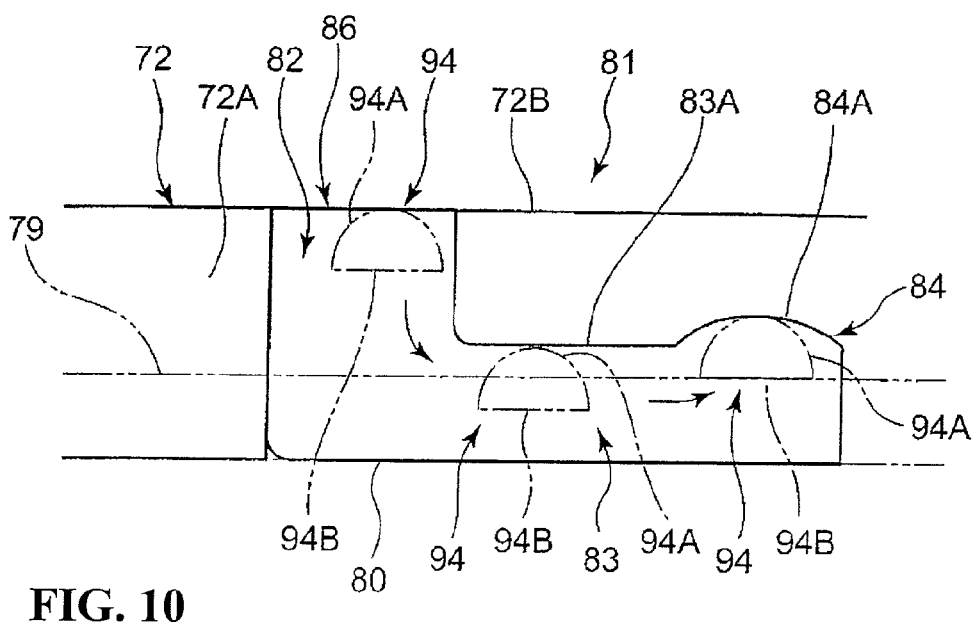
FIG. 10 is a view, as viewed from the inner peripheral side of a second tubular part, of a socket engaging part.

FIG. 10 is a view, as viewed from the inner peripheral side of the second tubular part 72, of the socket engaging part 81. While the socket engaging parts 81 are provided at the four positions in this embodiment, the socket engaging parts 81 are all configured similarly. In view of this, the socket engaging part 81 at one position will be described here.

As shown in FIGS. 8 and 10, the socket engaging part 81 is formed in a face end portion of the second tubular part 72, and has a cutout portion 86 which is cut out in a groove shape. The cutout portion 86 includes: a longitudinal passage portion 82 opening in a face end surface 72B of the second tubular part 72 and extending to a bottom portion 80; a transverse passage portion 83 extending in the circumferential direction of the second tubular part 72 along the bottom portion 80 from the longitudinal passage portion 82; and a protrusion accommodating portion 84 formed at an end of the transverse passage portion 83. In other words, the socket engaging part 81 is a roughly L-shaped groove which has the longitudinal passage portion 82 extending in the vertical direction in FIG. 10 and the transverse passage portion 83 extending in the left-right direction in the figure from a lower portion of the longitudinal passage portion 82. In addition, the roughly L-shaped groove is formed to be substantially uniform in depth in the radial direction.

The protrusion accommodating portion 84 is formed by cutting out a face-side wall 83A of the transverse passage portion 83 toward the side of the face end surface 72B, and has a curved surface shaped engaging portion 84A which is hollowed in a curved surface shape toward the side of the face end surface 72B.

As shown in FIG. 10, the reflector engaging part 94 enters the longitudinal passage portion 82 through the aperture of the longitudinal passage portion 82, passes through the transverse passage portion 83 to reach the protrusion accommodating portion 84, and is engaged with the curved surface shaped engaging portion 84A. More in detail, as shown in FIGS. 2 and 10, when the reflector engaging part 94 enters the longitudinal passage portion 82, the tip of the reflector tubular part 92 compresses the seal member 79 between itself and the bottom portion 80, whereby the gap between the face-side wall 83A and the seal member 79 is broadened so as to permit the reflector engaging part 94 to pass through the transverse passage portion 83. Then, the reflector engaging part 94 passes through the transverse passage portion 83, with its curved surface portion 94A being pressed against the face-side wall 83A by the resilience arising from the compression of the seal member 79, and is engaged with the protrusion accommodating portion 84.

In addition, since the reflector engaging part 94 is engaged in the state of being pressed against the protrusion accommodating portion 84 by the resilience of the seal member 79, the reflector 90 can be firmly fixed to the socket 70. Furthermore, since the reflector engaging part 94 is pressed against the protrusion accommodating portion 84 by the seal member 79, chattering between the reflector engaging part 94 and the protrusion accommodating portion 84 can be prevented.

A lower portion of the socket 70 shown in FIG. 8, namely, that portion of the socket 70 in the assembled state which corresponds to the lower surface side of the rear blinker 60, is provided with a drain groove 85 formed by hollowing the face end surface 72B of the second tubular part 72 one step toward the back end side. The drain groove 85 permits water having penetrated into a space between the socket 70 and the reflector 90 to be drained downward.

In addition, as shown in FIG. 9, the second tubular part 72 is formed in its back surface 72D with die-drawing holes 81A communicating with the socket engaging parts 81. The die-drawing holes 81A are holes for drawing out dies which are used for molding the socket engaging parts 81 as cavities at the time of molding the socket 70 from a resin.

Further, since the minus terminal 51 and the plus terminal 52 are passed through the terminal grooves 76 formed by hollowing a back end portion of the socket 70, the socket 70 can be made smaller in length in the face-back direction.

Now, a procedure for assembling the rear blinker 60 will be described below.

First, as shown in FIGS. 2 and 5, the bulb 64 is assembled onto the socket 70 in the condition where the minus terminal 51, the plus terminal 52 and the seal member 79 have been attached to the socket 70. As a result, a bulb unit body 110 having the bulb 64 and the socket 70 integrally mounted to each other is assembled. In this case, the bulb 64 is engaged with the engaging grooves 73A by only inserting the protuberant portions 64C into the inlet grooves 73C and performing a rotating operation, whereon the bulb 64 is in the state of being pressed against the engaging grooves 73A by the plus terminal 52. Accordingly, the bulb unit body 110 can be assembled easily.

Next, the bulb unit body 110 is assembled onto the reflector unit 100. More specifically, the bulb 64 is passed through the through-hole 93 from the back side of the reflector 90, and is disposed in the concave portion 90A. In addition, the reflector engaging parts 94 are inserted into the longitudinal passage portions 82 (see FIG. 10) in the socket 70, and are fitted to the socket engaging parts 81. Further, the seal member 79 is compressed by the reflector tubular part 92. In this condition, the socket 70 is turned counterclockwise in FIG. 8 about the axis of the bulb 64. Consequently, the reflector engaging parts 94 are passed through the transverse passage portions 83, to be engaged with the protrusion accommodating portions 84, whereby the bulb unit body 110 and the reflector unit 100 are integrally assembled together. While the assembling work has just been described assuming that the socket 70 is turned in the condition where the reflector engaging parts 94 are engaged with the socket engaging parts 81, it suffices for the socket 70 and the reflector engaging parts 94 to be turned relative to each other. Therefore, a method may be adopted in which the reflector engaging parts 94 are turned clockwise in FIG. 8.

Since the reflector engaging parts 94 molded to be integral with the reflector 90 are thus directly engaged with and mounted to the socket engaging parts 81 of the socket 70, a fixing member for exclusive use to fix the socket 70 onto the reflector 90 is made unnecessary, whereby the number of component parts can be reduced.

Subsequently, the waterproof cover 65 is attached to the socket 70. Then, the engaging protrusion 97 of the reflector 90 is engaged with the engaging protuberant portion 69 of the base member 61, the flange portion 95 is abutted on the mounting stepped portion 68 of the base member 61, and the screw 99 is fastened into the female screw portion 98A of the reflector 90 by way of the hole 61A in the base member 61, whereby the assembly of the rear blinker 60 is completed.

Now, referring to FIGS. 2, 11 and 12, the mounted state of the rear blinkers 60 onto the side covers 38 will be described below. The side covers 38 and the rear blinkers 60 are provided in pairs of left and right ones. In this embodiment, therefore, the rear blinker 60 and the side cover 38 on the left side will be described, while omitting the description of the rear blinker 60 and the side cover 38 on the right side.

Figure 11:
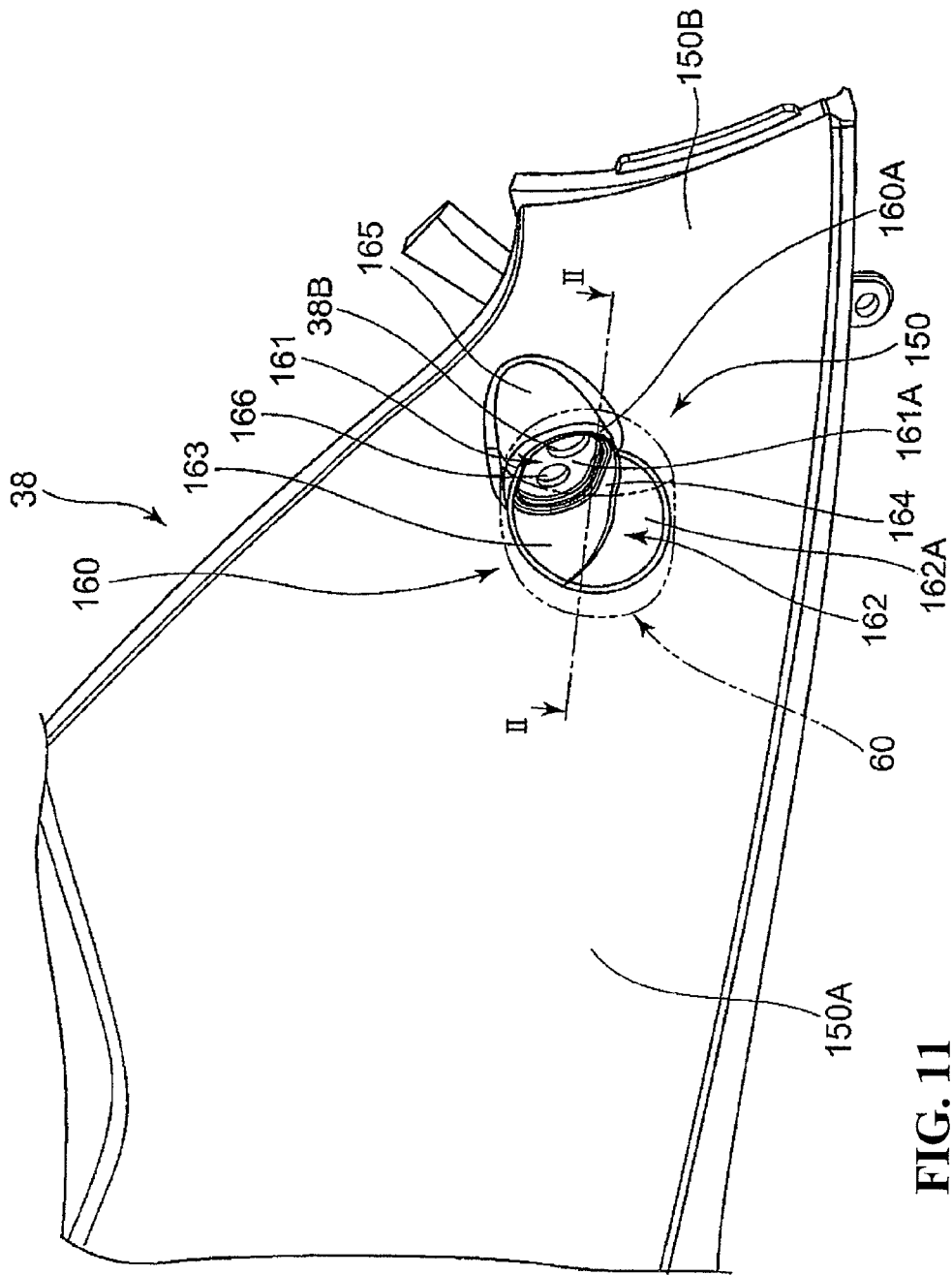
FIG. 11 is a perspective view of a side cover on the left side in the vehicle.

FIG. 11 is a perspective view of the side cover 38 on the left side in the vehicle. FIG. 12 is a sectional view taken along line XII-XII of FIG. 2, when the rear blinker 60 is viewed from the rear side of the vehicle.

FIG. 2 shows the rear blinker 60 indicated by two-dotted chain line in FIG. 11, in section along line II-II of FIG. 11. More specifically, FIG. 2 is a plan sectional view obtained by taking a section of the rear blinker 60 and the side cover 38 along a plane containing the optical axis C.

The side cover 38 is so formed that its width is generally reduced toward the rear side. As shown in top plan view in FIG. 2, in the vicinity of the rear blinker 60, the side cover 38 has a curved surface 150 the width of which is gradually reduced toward the rear side of the vehicle. In addition, as shown in FIG. 12, in rear view, the curved surface 150 is formed to be reduced in width toward the upper side of the vehicle.

In addition, as shown in FIG. 2, a cover maximum width portion 38C which is an outermost portion in the vehicle width direction of the left-side side cover 38 is located on the front side relative to the rear blinker 60. In FIG. 2, a maximum width line L indicative of the position of the maximum width of the side cover 38 is indicated by two-dotted chain line.

The curved surface 150 is formed with a recess 160 recessed toward the inside of the vehicle, and the rear blinker 60 is disposed at the recess 160. The recess 160 has a first recessed portion 161 to which the base part 67 is to be mounted, and a second recessed portion 162 continuous with the first recessed portion 161 and extending toward the lower side of the vehicle. In addition, the side cover 38 is provided, on the back side of the recess 160, with a back curved surface 150B which is so bent as to be reduced in width toward the inside of the vehicle at an angle greater than that of a face curved surface 150A on the face side of the recess 160.

The first recessed portion 161 is provided at its bottom portion with a plate part 161A for receiving a bottom surface 67D of the base part 67. The plate part 161A forms a surface substantially parallel to a vertical plane containing the center line S (see FIG. 2) passing through the center of the vehicle width. The curved surface 150 becomes smaller in width as one goes backward and as one goes upward. Therefore, the first recessed portion 161 is provided with a face-side wall part 163 interconnecting the curved surface 150 and a face edge portion of the plate part 161A, and a lower-side wall part 164 interconnecting the curved surface 150 and a lower edge portion of the plate part 161A. In addition, the first recessed portion 161 is provided at its back portion with a bulging portion 165 interconnecting the plate part 161A and the curved surface 150. The bulging portion 165 is formed by bulging part of the side cover 38 toward the outside of the vehicle. Further, the plate part 161A is provided with the wiring hole 38B and a screw hole 166 for insertion of the set screw 38A. The screw hole 166 is formed on the face side relative to the wiring hole 38B.

Figure 12:
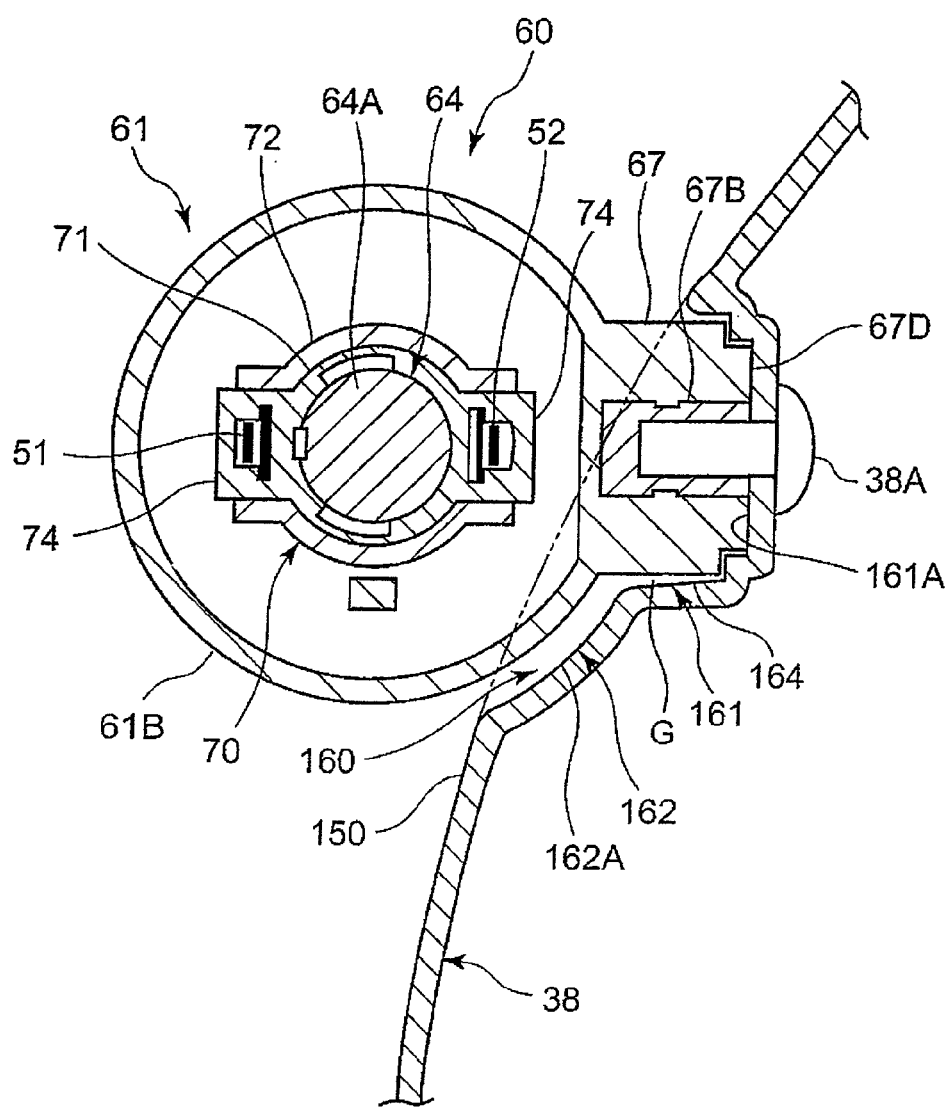
FIG. 12 is a sectional view taken along line XII-XII of FIG. 2.

As shown in FIG. 12, the second recessed portion 162 has a curved surface part 162A which is continuous with the lower-side wall part 164, extends downward toward the outer side in the vehicle width direction, and is formed along the shape of an outer peripheral surface of the case part 61B proximate to the second recessed portion 162. That portion of a lower surface portion of the case part 61B which is continuous with the base part 67 is disposed inside the second recessed portion 162. In other words, part of the case part 61B is disposed inside the second recessed portion 162.

As shown in FIGS. 2 and 12, the rear blinker 60 is mounted by fitting the base part 67 into the first recessed portion 161, and is fixed to the recessed portion 160 by the set screw 38A. In this condition, the set screw 38A is engaged with the screw hole 166, and a positioning protrusion 67C is engaged with the wiring hole 38B, so that the rear blinker 60 can be fixed assuredly.

The face-side wall part 163 of the first recessed portion 161 is formed to extend along the base part 67, and a clearance G of such a size as to permit easy mounting of the base part 67 to the first recessed portion 161 is provided between the base part 67 and the face-side wall part 163. In addition, a clearance G is provided also between the base part 67 and the lower-side wall part 164.

The rear blinker 60 is so disposed that the optical axis C is substantially parallel to the center line 5, and the rear blinker 60 is so mounted that the face of the lens 62 faces straight toward the rear side of the vehicle.

As shown in FIG. 2, in plan sectional view relevant to the optical axis C, the rear blinker 60 is mounted in the state of being exposed from the recess 160 so that substantially the whole body of the lens 62 does not overlap with the curved surface 150. More specifically, the whole of the lens 62 is located on the outer side in the vehicle width direction relative to the outline of an outside surface of the curved surface 150 in section containing the optical axis C, and is located on the rear side relative to the rear end 160A of the recess 160. Accordingly, on the rear side of the lens 62, there is nothing that obstructs the lens 62 from view.

In this embodiment, even in the case where the rear blinker 60 is provided at the recess 160, the recess 160 is not present on the rear side of the lens 62, and the recess 160 does not obstruct the lens 62 from view, so that the visibility of the lens 62 is not lowered by the recess 160. This ensures that, with the rear blinker 60 disposed at the recess 160, the influence of the rear blinker 60 on the appearance of the vehicle can be reduced, and, simultaneously, the visibility of the rear blinker 60 can be secured.

Furthermore, even in the case where the left-side rear blinker 60 is viewed from the right rear side of the vehicle across the center line S passing through the center of the vehicle width, as indicated by arrow X in FIG. 2, the lens 62 is not obstructed from view by the recess 160; therefore, the left-side rear blinker 60 can be seen from the right rear side of the vehicle, and the visibility of the rear blinker 60 can be enhanced. In this case, the visibility of the rear blinker 60 from the right rear side of the vehicle is enhanced more as the rear curved surface 150B is more slanted toward the side of the center line S.

In addition, as shown in FIG. 12, also in rear view, substantially the whole body of the rear blinker 60 exclusive of the base part 67 is exposed, and the upper side and the lower side of the lens 62 are not obstructed from view by the recess 160. Therefore, the visibility of the rear blinker 60 can be secured even in the case where the rear blinker 60 is disposed at the recess 160.

Furthermore, as shown in FIG. 2, the rear blinker 60 is entirely located on the inner side relative to the maximum width line L. Therefore, the rear blinker 60 can be protected against external forces and the like by the cover maximum width portion 38C, and, notwithstanding the configuration in which the rear blinker 60 is exposed from the recess 160, the rear blinker 60 can be protected by the side cover 38.

As shown in FIG. 2, the screw 99 for fixing the reflector 90 to the base member 61 is disposed at the lower surface 60A (see FIG. 3), and the screw 99 is located outside of and exposed from the recess 160. Therefore, despite the configuration in which the rear blinker 60 is disposed at the recess 160, the screw 99 can externally be attached and detached easily, so that the maintainability of the rear blinker 60 can be enhanced.

As has been described above, according to this embodiment of the present invention, even where each rear blinker 60 is disposed at the recess 160, substantially the whole part of the lens 62 does not overlap with the side cover 38 in plan sectional view as viewed from the upper side of the vehicle, the section containing the optical axis C of the bulb 64, so that a situation in which the lens 62 is obstructed from view by the side cover 38 and the recess 160 can be obviated. Therefore, the visibility of the rear blinkers 60 can be secured and small-type turn signal lamps can be adopted, while enhancing the appearance of the vehicle by disposing each rear blinker 60 at the recess 160 so that the rear blinker 60 and the side cover 38 have a feeling of integrity. More particularly, since substantially the whole part of the lens 62 is exposed from the recess 160, it is possible to secure visibility of each rear blinker 60, for example, the visibility of the rear blinker 60 on the left side as viewed from the right rear side of the vehicle across the center line S.

In addition, since the base part 67 and part of the case part 61B are disposed in the recess 160, each rear blinker 60 can be disposed in a compact fashion at the side cover 38 by suppressing the amounts of protrusion of the base part 67 and the case part 61B from the side cover 38, and the rear blinker 60 can be protected by the recess 160 from mud, small stones and the like.

In addition, the rear blinker 60 can be protected from external forces and the like by the cover maximum width portion 38C. In addition, even where the rear blinker 60 is exposed from the recess 160, the rear blinker 60 can be protected by the side cover 38.

Further, since the screw 99 is exposed from the recess 160, the screw 99 can externally be attached and detached easily and the maintainability of the screw 99 can be enhanced, even where the rear blinker 60 is disposed at the recess 160 of the side cover 38.

Furthermore, since the screw 99 is fastened at the lower surface 60A of the rear blinker 60 and the screw 99 is thus provided at such a position as to be difficult to see from the outside of the vehicle, the appearance of the rear blinkers 60 can be enhanced.

In addition, since the reflector 90 and the lens 62 are united by fusing, an effective reflecting surface of the reflector 90 can be secured sufficiently, and, even where the rear blinkers 60 are disposed at the recesses 160 in the side covers 38, a sufficient visibility of the rear blinkers 60 can be obtained. Accordingly, in the case where each rear blinker 60 is disposed at the recess 160, the need to enlarge the reflector 90 in size and to enlarge the rear blinker 60 in size for the purpose of securing the visibility of the rear blinker 60 can be eliminated, and the rear blinker 60 can be made inconspicuous, so that appearance can be enhanced.

Further, since the first recessed portion 161 and the second recessed portion 162 are formed along the shapes of the base part 67 and the case part 61B, the first recessed portion 161 and the second recessed portion 162 can be minimized in size, and the recess 160 is made difficult to see, so that the appearance of the vehicle can be enhanced.

In addition, since the bulging portion 165 is provided at a rear portion of the first recessed portion 161, it is possible to set only the lens 62 away from the curved surface 150 of the side cover 38, so that the visibility of the rear blinker 60 can be enhanced.

In addition, this embodiment is merely for showing a mode of applying the present invention, and the invention is not limited to the embodiment.

While the lens 62 has been described as having the lens-side engaging part 62A fused to the flange portion 95 and the wall portion 96 in this embodiment, this is not limitative of the present invention, and the lens 62 may be adhered to the flange portion 95 and the wall portion 96 by use of an adhesive.

In addition, while the bulb 64 has been described as being provided with the light emitting part 64B having a filament in this embodiment, this is not limitative of the present invention; for example, an LED (light emitting diode) may be used as a light source of the rear blinker 60. In addition, arbitrary modifications are naturally possible as to other details of the configuration of the motorcycle 10.

As has been described above, according to the embodiment of the present invention, the reflector engaging parts 94 formed to be integral with the reflector 90 are mounted directly to the socket engaging parts 81 of the socket 70. Therefore, a fixing member for exclusive use to fix the socket 70 to the reflector 90 is not necessary, whereby the number of component parts can be reduced, and assembleability and maintainability can be enhanced.

Further, the outer peripheral wall 92A of the outside surface 91B of the reflector 90 is provided with the reflector engaging parts 94. Therefore, the reflector engaging parts 94 do not obstruct reflection on the reflecting surface 91A, the reflection area of the reflector 90 can be prevented from being lowered, and a light emission area can be secured without enlarging the reflector 90 in size. Accordingly, a sufficient light emission area and a sufficient irradiation area of the reflector 90 can be secured while making the rear blinkers 60 smaller in size.

In addition, the bulb 64 and the socket 70 can be fixed to the reflector 90 by only fitting the socket engaging parts 81 of the socket 70, with the bulb 64 mounted thereon, to the reflector engaging parts 94 and turning the socket 70 in this condition. Consequently, assembleability and maintainability can be enhanced.

In addition, the outer peripheral wall 92A of the reflector tubular part 92 is provided with the reflector engaging parts 94, and the reflector engaging parts 94 are engaged with the socket engaging parts 81 provided at the inner peripheral wall 72A of the second tubular part 72. This makes it possible to minimize the diameter of the through-hole 93 in the reflector tubular part 92, to prevent the reflection area of the reflecting surface 91A of the reflector 90 from being reduced, and to secure a light emission area. In addition, since the socket engaging parts 81 are provided on the outer peripheral side of the first tubular part 71 and at the inner peripheral wall 72A of the second tubular part 72, the socket 70 can be reduced in size while securing the size of the first tubular part 71 for supporting the bulb 64.

In addition, the first tubular part 71 and the second tubular part 72 are integrally and coaxially provided on the inner and outer sides, respectively. Therefore, the holding of the bulb 64 by the through-hole 73 in the first tubular part 71 and the engagement of the socket engaging parts 81 of the second tubular part 72 with the reflector engaging parts 94 are also performed coaxially, so that the bulb 64 can be held with good positional accuracy relative to the reflector 90.

Further, since the terminal portions 51B and 52B are disposed at the stepped portions 78 formed at the back end portion of the socket 70, the socket 70 can be reduced in size in the face-back direction, and the rear blinker 60 can be reduced in size.

Furthermore, since the reflector engaging parts 94 can be held in the protrusion accommodating portions 84 by the resilience of the seal member 79, the socket 70 and the reflector 90 can be firmly fixed. In addition, since the socket 70 and the reflector 90 can be engaged with each other by holding the reflector engaging parts 94 in the protrusion accommodating portions 84 through utilizing the seal member 79 provided between the reflector tubular part 92 and the socket 70, the number of component parts can be reduced.

In addition, since the lens 62 and the reflector 90 are adhered and fixed to each other by fusing, without using any fixture such as screw, a situation in which a fixture interferes with the reflecting surface 91A of the reflector 90 to reduce the light emission area can be obviated, and a light emission area of the reflector 90 can be secured.

Further, since a sufficient light emission area of the rear blinkers 60 can be secured and the rear blinkers 60 can be made smaller in size, the rear blinkers 60 can be prevented from adversely influencing the appearance of the motorcycle 10, while obtaining a sufficient light emission amount and securing the visibility of the rear blinkers 60.

In addition, since the rear blinkers 60, made smaller in size while securing a sufficient light emission amount by securing a light emission area and an irradiation area of the reflectors 90, are provided at the recesses 160 in the side covers 38 so that the rear blinkers 60 are inconspicuous, the rear blinkers 60 can be prevented from adversely affecting the appearance of the vehicle, while securing the visibility of the rear blinkers 60. Furthermore, despite the configuration in which the rear blinkers 60 are provided at the recesses 160, the lenses 62 are not obstructed from view by the recesses 160 or the side covers 38, so that the visibility of the rear blinkers 60 can be secured.

In addition, the above-described embodiment is merely for showing a mode for carrying out the present invention, and the invention is not limited to the above embodiment.

While the lens 62 has been described as having the lens-side engaging part 62A fused to the flange portion 95 and the wall portion 96 in the embodiment above, this is not limitative of the present invention. For example, the lens 62 may be adhered to the flange portion 95 and the wall portion 96 by use of an adhesive.

In addition, while the rear blinker 60 of the motorcycle 10 has been described as the lamp for a vehicle in the embodiment above, this is not limitative of the present invention. The configuration of the rear blinker 60 may be applied to the front blinker 55. Further, the configuration of the lamp for a vehicle according to the present embodiment is applicable not only to the motorcycles but also to lamps for vehicles having three wheels, four wheels or more wheels. Furthermore, the configuration of the lamp for a vehicle according to the present embodiment is applicable not only to the rear blinker 60 but also to other lamps such as headlight, fog lamp, etc.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle comprising:
   a seat;
   a body cover covering the periphery of the lower side of the seat and formed in a curved shape such as to gradually decrease in width toward the rear side of the motorcycle; and
   turn signal lamps mounted at left and right portions in the motorcycle width direction of the body cover, each of the turn signal lamps including a base member mounted to the body cover, a light source, and a lens covering the light source;
   the left and right turn signal lamps being disposed at recesses provided in the body cover;
   wherein each of the left and right turn signal lamps is mounted to the body cover in such a manner that the lens is substantially entirely exposed from the recess so as not to overlap with a curved surface of the body cover in plan sectional view as viewed from the upper side of the motorcycle, the section containing an axis of the light source.

2. The motorcycle according to claim 1, wherein the base member comprises a base part for mounting to the body cover, and a case part for accommodating the light source and a reflector, and the base part and part of the case part are disposed inside the recess.

3. The motorcycle according to claim 1, wherein the whole part of the turn signal lamp is disposed at a position on the inner side relative to a maximum width in the motorcycle width direction of the body cover.

4. The motorcycle according to claim 2, wherein the whole part of the turn signal lamp is disposed at a position on the inner side relative to a maximum width in the motorcycle width direction of the body cover.

5. The motorcycle according to claim 2, wherein a fastening member for fixing the reflector or the lens to the case part is provided, and the fastening member is exposed from the recess.

6. The motorcycle according to claim 3, wherein a fastening member for fixing the reflector or the lens to the case part is provided, and the fastening member is exposed from the recess.

7. The motorcycle according to claim 5, wherein the fastening member is fastened at a lower surface of the turn signal lamp.

8. The motorcycle according to claim 5, wherein the reflector and the lens are coupled into integrity by adhesion or fusing, and
   the case part and the reflector are fastened by the fastening member.

9. The motorcycle according to claim 7, wherein the reflector and the lens are coupled into integrity by adhesion or fusing, and
   the case part and the reflector are fastened by the fastening member.

10. The motorcycle according to claim 2, wherein the recess includes a first recessed portion for accommodating the base part, and a second recessed portion for accommodating part of the case part, and the first recessed portion and the second recessed portion are found along the shapes of the base part and the case part.

11. The motorcycle according to claim 10, wherein the first recessed portion is provided at its rear portion with a bulging portion where part of the body cover bulges toward the outside of the motorcycle.

* * * * *